(12) United States Patent
Liu et al.

(10) Patent No.: US 11,984,579 B2
(45) Date of Patent: May 14, 2024

(54) POSITIVE ELECTRODE MATERIAL, ELECTROCHEMICAL DEVICE CONTAINING SAME, AND ELECTRONIC DEVICE

(71) Applicants: NINGDE AMPEREX TECHNOLOGY LIMITED, Ningde (CN); DONGGUAN AMPEREX TECHNLOGY LIMITED, Dongguan (CN)

(72) Inventors: Wenyuan Liu, Ningde (CN); Gang Peng, Ningde (CN); Ye Lang, Ningde (CN)

(73) Assignees: NINGDE AMPEREX TECHNOLOGY LIMITED, Ningde (CN); DONGGUAN AMPEREX TECHNOLOGY LIMITED, Dongguan (CN)

( * ) Notice: Subject to any disclaimer, the term of this patent is extended or adjusted under 35 U.S.C. 154(b) by 523 days.

(21) Appl. No.: 17/187,629

(22) Filed: Feb. 26, 2021

(65) Prior Publication Data
US 2021/0280848 A1   Sep. 9, 2021

Related U.S. Application Data

(63) Continuation of application No. PCT/CN2020/077940, filed on Mar. 5, 2020.

(51) Int. Cl.
*H01M 4/505* (2010.01)
*H01M 4/04* (2006.01)
*H01M 4/525* (2010.01)
*H01M 4/02* (2006.01)

(52) U.S. Cl.
CPC ......... *H01M 4/0471* (2013.01); *H01M 4/505* (2013.01); *H01M 4/525* (2013.01); *H01M 2004/021* (2013.01); *H01M 2004/028* (2013.01)

(58) Field of Classification Search
CPC ..... H01M 4/0471; H01M 4/505; H01M 4/525
See application file for complete search history.

(56) References Cited

U.S. PATENT DOCUMENTS

2019/0363348 A1* 11/2019 Kurita ................... H01M 4/386

\* cited by examiner

*Primary Examiner* — Olatunji A Godo
(74) *Attorney, Agent, or Firm* — Morgan, Lewis & Bockius LLP

(57) ABSTRACT

A positive electrode material includes secondary particles formed from primary particles. The positive electrode material satisfies the following relational expression: $15\% \leq (Dv50a-Dv50b)/Dv50b \leq 80\%$, where $Dv50a$ represents Dv50 directly measured by a laser particle size analyzer for the positive electrode material without ultrasonic treatment, $Dv50b$ represents Dv50 measured by the laser particle size analyzer for the positive electrode material after ultrasonic treatment, and Dv50 represents a particle size of the positive electrode material at a cumulative volume of 50% in a volume-based particle size distribution as measured by starting from small particle sizes. The secondary particles of the positive electrode material that meets the foregoing condition can form soft agglomerates, so that the electrochemical device is of high cycle performance and high safety performance.

16 Claims, 7 Drawing Sheets

POSITIVE ELECTRODE MATERIAL, ELECTROCHEMICAL DEVICE CONTAINING SAME, AND ELECTRONIC DEVICE

CROSS REFERENCE TO RELATED APPLICATIONS

The present application is a continuation application of PCT international application: PCT/CN2020/077940, entitled "Positive Electrode Material, Electrochemical Device Containing Same, and Electronic Device" filed on 5 Mar. 2020, the disclosure of which is hereby incorporated by reference in its entirety.

TECHNICAL FIELD

This application relates to the technical field of energy storage, and in particular, to a positive electrode material, an electrochemical device containing the positive electrode material, and an electronic device.

BACKGROUND

With rapid development of mobile electronic technologies, people are using a mobile electronic device such as a mobile phone, a tablet computer, a notebook computer, and an unmanned aerial vehicle more often and people's experience requirements are increasingly higher. Therefore, an electrochemical device (such as a lithium-ion battery) that provides energy for the electronic device needs to provide a higher energy density, a higher C-rate, higher safety, and less fading of capacity that occurs after repeated charge and discharge processes.

Development and use of a higher-energy-density and cost-efficient lithium transition metal oxide as a positive electrode material is one of main pursuits of research and improvement in the field of the electrochemical device. However, as the energy density of the electrochemical device increases, a particle structure of the positive electrode material increasingly affects cycle performance and safety performance of the electrochemical device. Therefore, in addition to seeking a new type of positive electrode material, improvement and optimization of the particle structure of the positive electrode material are also an important solution.

SUMMARY

This application provides a positive electrode material, an electrochemical device containing the positive electrode material, and an electronic device in an attempt to solve at least one problem in the related art to at least some extent.

According to an aspect of this application, this application provides a positive electrode material. The positive electrode material includes secondary particles. The secondary particles are formed from primary particles. The positive electrode material satisfies the following relational expression: $15\% \leq (Dv50a-Dv50b)/Dv50b \leq 80\%$, where $Dv50a$ represents Dv50 directly measured by a laser particle size analyzer for the positive electrode material without ultrasonic treatment, $Dv50b$ represents Dv50 measured by the laser particle size analyzer for the positive electrode material after ultrasonic treatment, and Dv50 represents a particle size of the positive electrode material at a cumulative volume of 50% in a volume-based particle size distribution as measured by starting from small particle sizes.

According to another aspect of this application, this application provides an electrochemical device, including a negative electrode, a separator, and a positive electrode. The positive electrode includes the positive electrode material.

According and another aspect of this application, this application provides an electronic device. The electronic device includes the electrochemical device.

The positive electrode material according to this application can include the secondary particles formed by soft agglomeration of primary particles, so that the electrochemical device can effectively reduce ruptures of the positive electrode material in the positive electrode during cycling and is of high cycle performance and high safety performance.

Additional aspects and advantages of the embodiments of this application will be described or illustrated in part later herein or expounded through implementation of the embodiments of this application.

BRIEF DESCRIPTION OF THE DRAWINGS

For ease of describing the embodiments of this application, the following outlines the drawings necessary for describing the embodiments of this application or the prior art. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION OF EMBODIMENTS

Figure 1:
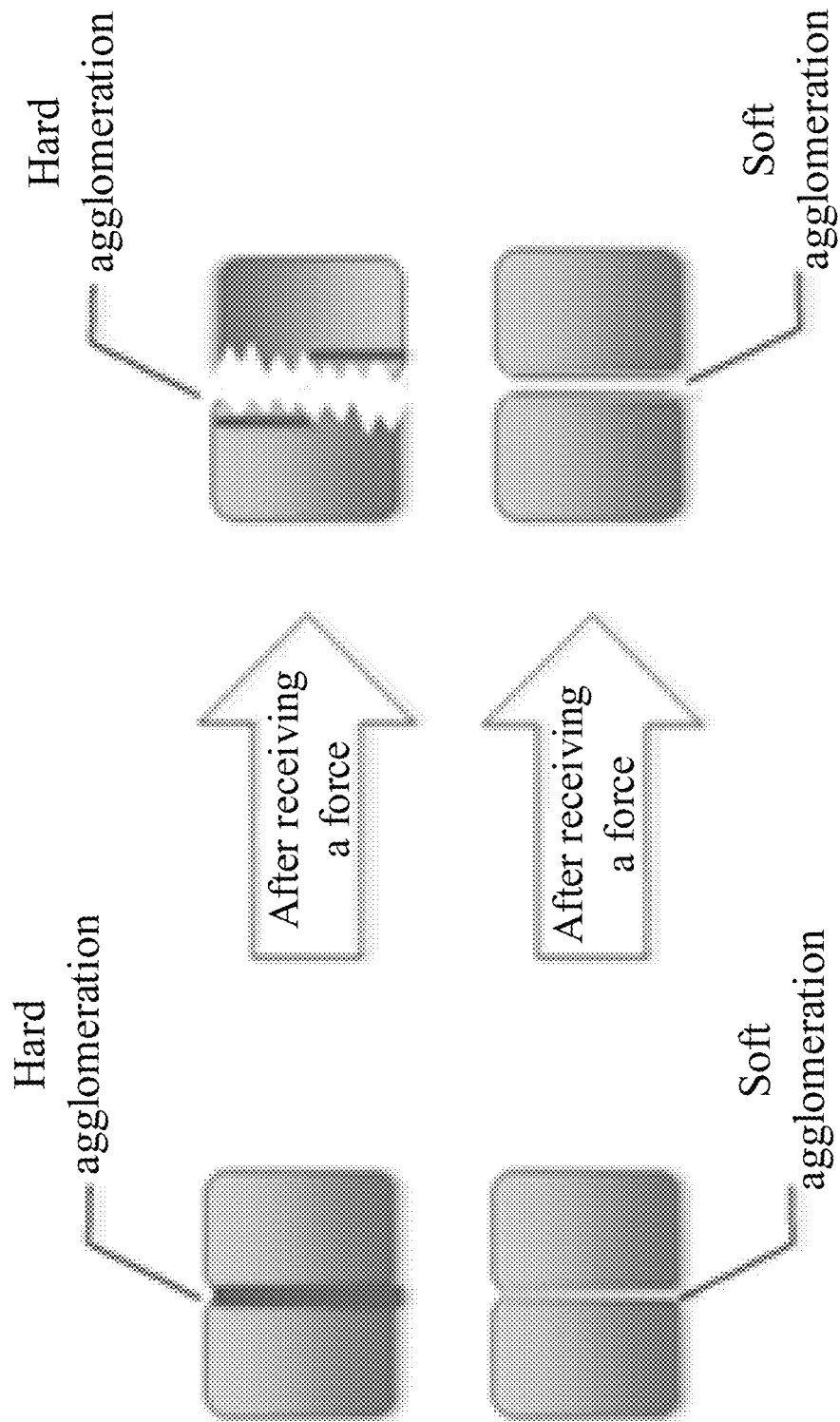
FIG. 1 is a schematic diagram of hard agglomeration and soft agglomeration of secondary particles of a positive electrode material.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application shall not be construed as a limitation on this application.

A quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each subrange were explicitly specified.

In the description of embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

In specific implementations and the claims, the term "particle size" means a particle size of a positive electrode material under a laser particle size test with a Mastersizer 2000 laser particle size distribution analyzer. Main indicators indicative of particle characteristics include Dv10, Dv50, Dv90, Dv99, and the like. Dv50 represents a particle size of the positive electrode material at a cumulative volume of 50% in a volume-based particle size distribution as measured by starting from small particle sizes, Dv10 represents a particle size of the positive electrode material at a cumulative volume of 10% in the volume-based particle size distribution as measured by starting from small particle sizes, Dv90 represents a particle size of the positive electrode material at a cumulative volume of 90% in the volume-based particle size distribution as measured by starting from small particle sizes, and Dv99 represents a particle size of the positive electrode material at a cumulative volume of 99% in the volume-based particle size distribution as measured by starting from small particle sizes.

One of causes for cycle fading and gas generation of an electrochemical device is particle ruptures of the positive electrode material, including but without limitation, particle ruptures caused in cold calendering during preparation and ruptures caused by repeated expansion and contraction of primary particles during charge and discharge cycles. The particle ruptures of the positive electrode material lead to formation of particulate matters in a positive electrode plate. Due to a relatively small particle size and a relatively large specific surface area of the particulate matters, the particulate matters are extremely likely to react with an electrolytic solution, giving rise to problems such as capacity fading and gas generation, and consequently shortening a cycle life of the electrochemical device or even bringing safety hazards.

According to this application, a process of preparing the positive electrode material is adjusted to make a particle structure of the positive electrode material looser, and reduce particle ruptures caused by an external force on the positive electrode material in a preparation process or a cycle process.

According to an aspect of this application, an embodiment of this application provides a positive electrode material, including secondary particles formed from primary particles. The positive electrode material satisfies the following relational expression:

$15\% \leq (Dv50a-Dv50b)/Dv50b \leq 80\%$, where, Dv50a represents Dv50 directly measured by a laser particle size analyzer for the positive electrode material without ultrasonic treatment, and Dv50b represents Dv50 measured by the laser particle size analyzer for the positive electrode material after ultrasonic treatment. The positive electrode material that meets the foregoing condition includes the secondary particles formed by "soft agglomeration", where the "soft agglomeration" means that a large part of the primary particles in the secondary particles are merely attracted and bonded by a van der Waals force or an electrostatic attraction force, and an acting force between the particles is relatively weak. Therefore, after the secondary particles formed by the "soft agglomeration" of the primary particles are ultrasonically treated, the acting force between some primary particles in the secondary particles can be eliminated. Therefore, the secondary particles can be split into smaller secondary particles or primary particles, thereby decreasing Dv50 of the positive electrode material.

In the ultrasonic treatment in this embodiment of this application, a sample is treated at a frequency of 40 KHz and at a power of 180 W for 5 minutes by using a sample feeding system (Hydro 2000SM wet dispersion).

As shown in FIG. 1, when the secondary particles are formed from compactly agglomerated primary particles, the secondary particles are bonded by "hard-agglomerating" the primary particles. To be specific, the secondary particles are compact agglomerates connected by the acting force of chemical bonds and hydrogen bonds, and hardly removable by an external force. In the process of cold calendering, when a large external force is applied to the secondary particles that are hard-agglomerated to a high degree, the secondary particles are prone to ruptures caused by intense extrusion and friction. Similarly, in a charge and discharge cycle, due to repeated contraction and expansion of the primary particles, a microstress is generated throughout the secondary particles, and the secondary particles that are hard-agglomerated to a high degree are also prone to rupture for this reason.

Conversely, when the secondary particles are formed by soft-agglomerating the primary particles, the secondary particles can drift in a force bearing direction to eliminate a part of agglomeration. This reduces particle ruptures that occur during cold calendering, and indirectly increases the compacted density of the positive electrode plate. On the other hand, the secondary particles that are soft-agglomerated to a high degree can balance a stress generated by the repeated contraction and expansion of the primary particles in the charge and discharge cycle, thereby reducing formation of particle cracks, increasing the cycle life, and reducing gas generation. In addition, a decline percentage of the particle size Dv50 of the positive electrode material before and after the ultrasonic treatment may be controlled to ensure a relatively high degree of the soft agglomeration of the secondary particles in the positive electrode material. In this way, the particles in the positive electrode material are not too loose, and it is ensured that the positive electrode material keeps a specific bonding force during the cycle and that the electrochemical device containing the positive electrode material keeps a specific energy density and cycle performance.

In some embodiments, the positive electrode material further satisfies the following relational expression:

$15\% \leq (Dv10a-Dv10b)/Dv10b \leq 80\%$, where, Dv10a represents Dv10 directly measured by a laser particle size analyzer for the positive electrode material without ultrasonic treatment, and Dv10b represents Dv10 measured by the laser particle size analyzer for the positive electrode material after ultrasonic treatment. In some embodiments, the positive electrode material satisfies the following relational expression: $30\% \leq (Dv10a-Dv10b)/Dv10b \leq 50\%$.

In some embodiments, the positive electrode material further satisfies the following relational expression:

$$15\% \leq (Dv90a - Dv90b)/Dv90b \leq 80\%,$$

where, Dv90a represents Dv90 directly measured by the laser particle size analyzer for the positive electrode material without ultrasonic treatment, and Dv90b represents Dv90 measured by the laser particle size analyzer for the positive electrode material after ultrasonic treatment. In some embodiments, the positive electrode material satisfies the following relational expression: $30\% \leq (Dv90a - Dv90b)/Dv90b \leq 50\%$.

In some embodiments, the positive electrode material further satisfies the following relational expression:

$$10\% \leq (Dv99a - Dv99b)/Dv99b \leq 500\%,$$

where, Dv99a represents Dv99 directly measured by the laser particle size analyzer for the positive electrode material without ultrasonic treatment, and Dv99b represents Dv99 measured by the laser particle size analyzer for the positive electrode material after ultrasonic treatment.

In some embodiments, the particle size Dv50b of the ultrasonically treated positive electrode material is 2 μm to 8 μm. In other embodiments, the particle size Dv50b of the ultrasonically treated positive electrode material is 3 μm to 6 μm.

In this specification, the term "distribution span" is also called a span. A method for calculating the span is (Dv90−Dv10)/Dv50, and the span represents a particle distribution of the positive electrode material.

In some embodiments, the positive electrode material further satisfies the following relational expression:

$$1.0 \leq (Dv90b - Dv10b)/Dv50b \leq 2.5,$$

that is, the distribution span after ultrasonic treatment is 1.0 to 2.5. In other embodiments, the distribution span of the ultrasonically treated positive electrode material is 1.2 to 2.0.

In some embodiments, an average particle size of the primary particles of the positive electrode material is 0.5 μm to 3 μm. In some embodiments, the average particle size of the primary particles is approximately, for example, 0.5 μm, 0.8 μm, 1.0 μm, 1.5 μm, 2.0 μm, 2.5 μm, 3.0 μm, or a range formed by any two of such values. An average particle size range of the primary particles of the positive electrode material in this embodiment of this application makes it easier for the secondary particles to form soft agglomerates, thereby improving the cycle performance of the electrochemical device.

In specific embodiments and the claims, the term "average particle size" is an average value of longest diameters of the primary particles in a microscopic image obtained in a test performed with a scanning electron microscope.

According to some embodiments of this application, the positive electrode material includes at least one of compounds represented by a chemical formula $Li_xNi_yM1_zM2_uO_2$, where $0.95 \leq x \leq 1.05$, $0.33 < y < 1$, $0 < z \leq 0.6$, $0 \leq u \leq 0.2$, $y+z+u=1$, M1 is selected from groups that each includes Co, Mn, Al, and any combination thereof, and M2 is selected from groups that each includes Sc, V, Cr, Fe, Cu, Zn, Y, Zr, Nb, Mo, Tc, Ru, Rh, Pd, Ag, Cd, La, Ce, Pr, Nd, Pm, Sm, Eu, Gd, Tb, Dy, Ho, Er, Tm, Yb, Lu, Mg, Ti, and any combination thereof.

Understandably, without departing from the inventive spirit of this application, a person skilled in the art may select any conventional positive active material in the art according to specific requirements without limitation.

In some embodiments, the secondary particles of the positive electrode material further include a material layer. The material layer is disposed on at least a part of a surface of the secondary particles. The material layer includes at least one of elements B, P, Al, Zr, C, or S.

In some embodiments, the method for preparing the positive electrode material in this application includes the following steps:

selecting a positive active material precursor whose average particle size is 2 μm to 7 μm and whose distribution span is greater than 0.6, mixing the precursor with a lithium salt and a doping ingredient at a substrate stoichiometric ratio, and then perform sintering for a first time at a sintering temperature of 800° C. to 880° C., with a heat treatment period being 10 hours to 20 hours; after the sintering is performed for the first time, washing with water and drying the first-time sintered product, mixing the first-time sintered product with the material of the material layer, and then performing sintering for a second time at a sintering temperature of 350° C. to 400° C., with a heat treatment period being 4 hours to 8 hours; then performing cooling, drying, and grading to obtain a positive electrode material.

In some embodiments, a tapped density of the positive electrode material is 1.5 g/cm$^3$ to 2.5 g/cm$^3$.

Understandably, the steps in the method for preparing the positive electrode material in this embodiment of this application may be, but are not limited to, selected from or may replace other conventional processing methods in the art according to specific requirements without departing from the spirit of this application.

According to another aspect of this application, another embodiment of this application further provides an electrochemical device that includes the positive electrode material according to this application. In some embodiments, the electrochemical device is a lithium-ion battery. The lithium-ion battery includes: a negative electrode, a separator, and a positive electrode. The separator is disposed between the positive electrode and the negative electrode. The positive electrode includes the positive electrode material according to the foregoing embodiment.

In some embodiments, the positive electrode further includes a positive current collector, and the negative electrode further includes a negative current collector. The positive current collector may be an aluminum foil or a nickel foil, and the negative current collector may be a copper foil or a nickel foil. However, other positive current collectors and negative current collectors commonly used in the art may also be used without limitation.

In some embodiments, a compacted density of the positive electrode is 4.05 g/cm$^3$ to 4.3 g/cm$^3$.

In some embodiments, the negative electrode includes a negative electrode material capable of absorbing and releasing lithium (Li) (hereinafter sometimes referred to as "negative electrode material capable of absorbing/releasing lithium Li"). Examples of the negative electrode material capable of absorbing/releasing lithium (Li) may include a carbon material, a metal compound, an oxide, a sulfide, a lithium nitride such as LiN$_3$, a lithium metal, a metal that combines with lithium into an alloy, and a polymer material.

In some embodiments, the positive electrode and the negative electrode each can independently further include at least one of a binder and a conductive agent.

In some embodiments, the binder includes at least one of a polyvinylidene fluoride, a vinylidene fluoride-hexafluoropropylene copolymer, a polyamide, a polyacrylonitrile, a polyacrylic ester, a polyacrylic acid, a sodium polyacrylate, a sodium carboxymethyl cellulose, a polyvinylpyrrolidone, a polyvinyl ether, a poly methyl methacrylate, a polytetrafluoroethylene, a polyhexafluoropropylene, and styrene butadiene rubber. In some embodiments, the conductive agent includes at least one of a carbon nanotube, a carbon fiber, conductive carbon black, acetylene black, graphene, and Ketjen black. Understandably a person skilled in the art may select a conventional binder and a conventional conductive agent according actual needs without limitation.

In some embodiments, the separator includes, but is not limited to, at least one of polyethylene, polypropylene, polyethylene terephthalate, polyimide, and aramid. For example, the polyethylene includes a component selected from at least one of high-density polyethylene, low-density polyethylene, and ultra-high-molecular-weight polyethylene. Especially the polyethylene and the polypropylene are highly effective in preventing short circuits, and improve stability of the lithium-ion battery through a shutdown effect.

The lithium-ion battery according to this application further includes an electrolyte. The electrolyte may be one or more of a gel electrolyte, a solid-state electrolyte, and an electrolytic solution. The electrolytic solution includes a lithium salt and a nonaqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt is $LiPF_6$ because it provides a high ionic conductivity and improves cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, and any combination thereof.

In some embodiments, the nonaqueous solvent is selected from groups that each include ethylene carbonate, propylene carbonate, diethyl carbonate, dimethyl carbonate, ethyl methyl carbonate, propylene carbonate, methyl acetate, ethyl propionate, propyl propionate, and any combination thereof.

Understandably, the method for preparing the positive electrode, the negative electrode, the separator, and the lithium-ion battery in this embodiment of this application may be, but are not limited to, any appropriate conventional method in the art according to specific requirements without departing from the spirit of this application. In an implementation of the method for manufacturing an electrochemical device, the method for preparing a lithium-ion battery includes: winding, folding, or stacking the positive electrode, the separator, and the negative electrode in the foregoing embodiment sequentially into an electrode assembly; putting the electrode assembly into, for example, an aluminum laminated film, and injecting an electrolytic solution; and then performing steps such as vacuum packaging, static standing, formation, and reshaping to obtain a lithium-ion battery.

Although the lithium-ion battery is used as an example for description above, a person skilled in the art after reading this application understands that the positive electrode material in this application is applicable to other suitable electrochemical devices. Such electrochemical devices include any device in which an electrochemical reaction occurs. Specific examples of the devices include all kinds of primary batteries, secondary batteries, fuel batteries, solar batteries, or capacitors. In particular, the electrochemical device is a lithium secondary battery, including a lithium metal secondary battery, a lithium-ion secondary battery, a lithium polymer secondary battery, or a lithium-ion polymer secondary battery.

Some embodiments of this application further provide an electronic device. The electronic device includes the electrochemical device in the embodiments of this application.

The electronic device applicable to the embodiments of this application is not specifically limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

EMBODIMENTS

The following enumerates some specific embodiments and comparative embodiments, performs laser particle size analysis and scanning electron microscope tests on the positive electrode materials thereof, and performs a cycle performance test, a cycle expansion rate test, and a storage expansion rate test on the electrochemical device (the lithium-ion battery) thereof to better describe the technical solution of this application.

I. Test Methods 1.1 Laser Particle Size Test and Ultrasonic Treatment

The laser particle size test is to test a particle distribution based on a principle that particles of different sizes can cause a laser beam to scatter at different intensities. In the embodiments and comparative embodiments of this application, a particle size of sample particles is analyzed by using a Mastersizer 2000 laser particle size distribution analyzer. The test steps include: dispersing samples in 100 mL of dispersant (deionized water) so that a shading degree is 8~12%; analyzing a laser particle size distribution on the samples to obtain particle distribution data of the samples without ultrasonic treatment;

then ultrasonically treating the samples at an ultrasonic intensity of 40 KHz (frequency) and 180 W (power) for 5 minutes by using a sample feeding system (Hydro 2000SM wet dispersion); and analyzing the laser particle size distribution of the samples after the ultrasonic treatment, so as to obtain particle distribution data of the samples after ultrasonic treatment.

1.2 Scanning Electron Microscope Test

Performing imaging of the positive electrode material in the embodiments of this application and the positive electrode material in comparative embodiments by using a 500× scanning electron microscope (Germany ZEISS Sigma-02-33), and then randomly selecting 200 to 600 complete-shaped and unshaded primary particles of the positive electrode material from an electron microscope image of the positive electrode material, recording an average value of longest diameters of the primary particles in the microscopic image, and using the average value as an average particle size.

1.3 Cycle Performance Test

Putting the lithium-ion batteries in the following embodiments and comparative embodiments into a 45° C.±2° C. thermostat, leaving the batteries to stand for 2 hours, charging the batteries at a constant current of 1.5 C until the voltage reaches 4.25 V, and then charging the batteries at a constant voltage of 4.25 V until the current reaches 0.02 C, and leaving the batteries to stand for 15 minutes; discharging the batteries at a constant current of 4.0 C until the voltage reaches 2.8 V, thereby completing one charge and discharge cycle process; recording a discharge capacity of the lithium-ion batteries in a first cycle; then performing 500 charge and discharge cycles repeatedly according to the foregoing method, and recording a discharge capacity after the $500^{th}$ cycle; and taking 4 lithium-ion batteries for each group, and calculating an average value of a capacity retention rate of the lithium-ion batteries: cycle capacity retention rate of the lithium-ion batteries=(the discharge capacity (mAh) after the $500^{th}$ cycle/the discharge capacity (mAh) after the first cycle×100%.

1.4 Test of a 500-Cycle Expansion Rate

Using a thickness measuring device to measure a thickness of the lithium ion batteries after the $500^{th}$ cycle, and recording a thickness change after the $500^{th}$ cycle in the cycle test; and taking 4 lithium-ion batteries for each group, calculating a cycle expansion rate of the lithium-ion batteries after the $500^{th}$ cycle, where a lithium-ion battery that has not been cyclically charged or discharged after formation is a fresh lithium-ion battery:

500-cycle expansion rate=(thickness of the lithium-ion battery after the $500^{th}$ cycle/thickness of the fresh lithium-ion battery−1)×100%.

1.5 Test of a High-Temperature Storage Expansion Rate

Putting the lithium-ion batteries in the following embodiments and comparative embodiments into a 25° C.±2° C. thermostat, leaving the batteries to stand for 2 hours, charging the batteries at a constant current of 1.5 C until the voltage reaches 4.25 V, and then charging the batteries at a constant voltage of 4.25 V until the current reaches 0.05 C, and storing the lithium-ion batteries in an 85° C.±2° C. thermostat for 12 hours; upon completion of the high-temperature storage, using a thickness measuring device to measure the thickness of the lithium-ion batteries after the high-temperature storage, and recording the thickness change after the high-temperature storage; and taking 4 lithium-ion batteries for each group, and calculating the high-temperature storage expansion rate of the lithium-ion batteries:

high-temperature storage expansion rate=(thickness of the lithium-ion battery after the high-temperature storage/thickness of the fresh lithium-ion battery−1)×100%.

II. Preparation Methods 2.1 Preparing a Positive Electrode

Mixing the positive electrode materials in the following embodiments and comparative embodiments with acetylene black and polyvinylidene fluoride at a mass ratio of 94:3:3, and dissolving the mixture in an N-methylpyrrolidone (NMP) solution to form a positive electrode slurry; and using an aluminum foil as a positive current collector, coating the positive electrode slurry onto the positive current collector; and performing drying, cold calendering, and cutting steps to obtain a positive electrode.

2.2 Preparing a Negative Electrode

Mixing artificial graphite, acetylene black, styrene-butadiene rubber, and sodium carboxymethyl cellulose at a mass ratio of 96:1:1.5:1.5, and dissolving the mixture in deionized water to form a negative electrode slurry; and using an aluminum foil as a negative current collector, coating the negative electrode slurry onto the negative current collector; and performing drying, cold calendering, and cutting steps to obtain a negative electrode.

2.3 Preparing a Separator

Dissolving polyvinylidene difluoride in water, and mechanically stirring the water to form a homogeneous slurry; coating the slurry onto both sides of a porous substrate (polyethylene), with both of the sides having been coated with a ceramic coating; and performing drying to form a separator.

2.4 Preparing an Electrolytic Solution

In an environment with a water content of less than 10 ppm, mixing lithium hexafluorophosphate with a nonaqueous organic solvent (ethylene carbonate (EC):diethyl carbonate (DEC):propylene carbonate (PC):propyl propionate (PP):vinylene carbonate (VC)=20:30:20:28:2 mass ratio) at a mass ratio of 8:92 to prepare an electrolytic solution.

2.5 Preparing a Lithium-Ion Battery

Stacking the positive electrode, the separator, and the negative electrode sequentially, placing the separator between the positive electrode and the negative electrode to serve a separation function, and then winding them into an electrode assembly; putting the electrode assembly into an aluminum laminated film packaging bag, and performing drying at 80° C. to obtain a dry electrode assembly; and injecting the electrolytic solution into the dry electrode assembly, and performing steps such as vacuum packaging, static standing, formation, and reshaping to complete preparing the lithium-ion batteries in the following embodiments and comparative embodiments.

Embodiment 1

Mixing a transition metal material (nickel-cobalt-manganese) precursor (Dv50 of the precursor is 4 μm after ultrasonic treatment, and a distribution span of the precursor is 0.8 after ultrasonic treatment) with $Li_2CO_3$ and MgO at a stoichiometric ratio of $LiNi0.85Co0.08Mn0.05Mg0.02O2$; sintering the mixture at 840° C. in an oxygen atmosphere for 14 hours for a first time, washing the mixture with water, and drying the mixture to obtain a first-time sintered product; homogeneously mixing the first-time sintered product with a boric acid ($H_3BO_3$); performing sintering at 400° C. in an oxygen atmosphere for 5 hours for a second time, and sifting the sintered product with a double-layer sieve to obtain a positive electrode material.

Embodiment 2

The preparation method is the same as that in Embodiment 1, but differences are: in Embodiment 2, Dv50 of the transition metal material (nickel-cobalt-manganese) precursor after ultrasonic treatment is 2 μm.

Embodiment 3

The preparation method is the same as that in Embodiment 1, but differences are: in Embodiment 3, Dv50 of the transition metal material (nickel-cobalt-manganese) precursor after ultrasonic treatment is 3 µm.

Embodiment 4

The preparation method is the same as that in Embodiment 1, but differences are: in Embodiment 4, Dv50 of the transition metal material (nickel-cobalt-manganese) precursor after ultrasonic treatment is 5 µm.

Embodiment 5

The preparation method is the same as that in Embodiment 1, but differences are: in Embodiment 5, Dv50 of the transition metal material (nickel-cobalt-manganese) precursor after ultrasonic treatment is 6 µm.

Embodiment 6

The preparation method is the same as that in Embodiment 1, but differences are: in Embodiment 6, Dv50 of the transition metal material (nickel-cobalt-manganese) precursor after ultrasonic treatment is 7 µm, and a quick stirring duration is 6 hours.

Embodiment 7

The preparation method is the same as that in Embodiment 1, but differences are: in Embodiment 7, the distribution span of the transition metal material (nickel-cobalt-manganese) precursor after ultrasonic treatment is 0.7.

Embodiment 8

The preparation method is the same as that in Embodiment 1, but differences are: in Embodiment 8, the distribution span of the transition metal material (nickel-cobalt-manganese) precursor after ultrasonic treatment is 0.9.

Embodiment 9

The preparation method is the same as that in Embodiment 1, but differences are: in Embodiment 9, the distribution span of the transition metal material (nickel-cobalt-manganese) precursor after ultrasonic treatment is 1.0.

Embodiment 10

The preparation method is the same as that in Embodiment 1, but differences are: in Embodiment 10, the distribution span of the transition metal material (nickel-cobalt-manganese) precursor after ultrasonic treatment is 1.1.

Embodiment 11

The preparation method is the same as that in Embodiment 1, but differences are: in Embodiment 11, the first-time sintering is performed at 800° C.

Embodiment 12

The preparation method is the same as that in Embodiment 1, but differences are: in Embodiment 12, the first-time sintering is performed at 820° C.

Embodiment 13

The preparation method is the same as that in Embodiment 1, but differences are: in Embodiment 13, the first-time sintering is performed at 860° C.

Embodiment 14

The preparation method is the same as that in Embodiment 1, but differences are: in Embodiment 14, the first-time sintering is performed at 880° C.

Embodiment 15

The preparation method is the same as that in Embodiment 1, but differences are: in Embodiment 15, no second-time sintering is performed but the first-time sintered product is sifted to obtain a positive electrode material.

Embodiment 16

The preparation method is the same as that in Embodiment 1, but differences are: in Embodiment 16, a single-layer sieve is used for sifting to obtain a positive electrode material.

Comparative Embodiment 1

The preparation method is the same as that in Embodiment 9, but differences are: in Comparative Embodiment 1, Dv50 of the transition metal material (nickel-cobalt-manganese) precursor after ultrasonic treatment is 12 µm, a first-time sintering temperature is 780° C., and a first-time sintering duration is 12 hours.

Comparative Embodiment 2

The preparation method is the same as that in Embodiment 9, but differences are: in Comparative Embodiment 1, Dv50 of the transition metal material (nickel-cobalt-manganese) precursor after ultrasonic treatment is 2 µm, a first-time sintering temperature is 760° C., and a first-time sintering duration is 12 hours.

A laser particle size test and a scanning electron microscope test are performed on the positive electrode material disclosed in the foregoing embodiments and comparative embodiments, and test results are recorded. A cycle performance test, a 500-cycle expansion rate test, and a high-temperature storage expansion rate test are performed on the lithium-ion batteries, and test results are recorded.

Statistic values of the positive electrode material and the precursor thereof in Embodiments 1~16 and Comparative Embodiments 1 and 2, and the results of the laser particle size test and the scanning electron microscope test, are shown in Table 1 below.

TABLE 1

| Embodiment/ Comparative Embodiment | Precursor Dv50 (μm) | Precursor Distribution span | First-time sintering Temperature (° C.) | Dv50b of secondary particles after ultrasonic treatment (μm) | Distribution span of secondary particles after ultrasonic treatment | Average particle size of primary particles (μm) | (Dv50a − Dv50b)/ Dv50b | (Dv10a − Dv10b)/ Dv10b | (Dv90a − Dv90b)/ Dv90b | (Dv99a − Dv99b)/ Dv99b |
|---|---|---|---|---|---|---|---|---|---|---|
| Embodiment 1 | 4 | 0.8 | 840 | 4.3 | 1.4 | 1.5 | 49% | 48% | 49% | 242% |
| Embodiment 2 | 2 | 0.8 | 840 | 2.2 | 1.7 | 1.5 | 79% | 78% | 77% | 490% |
| Embodiment 3 | 3 | 0.8 | 840 | 3.5 | 1.5 | 1.5 | 66% | 66% | 66% | 360% |
| Embodiment 4 | 5 | 0.8 | 840 | 5.7 | 1.3 | 1.5 | 41% | 40% | 42% | 212% |
| Embodiment 5 | 6 | 0.8 | 840 | 6.7 | 1.2 | 1.5 | 28% | 27% | 29% | 138% |
| Embodiment 6 | 7 | 0.8 | 840 | 8.0 | 1.0 | 1.5 | 14% | 16% | 15% | 12% |
| Embodiment 7 | 4 | 0.7 | 840 | 4.2 | 1.0 | 1.5 | 38% | 36% | 37% | 200% |
| Embodiment 8 | 4 | 0.9 | 840 | 4.4 | 1.6 | 1.5 | 56% | 55% | 57% | 220% |
| Embodiment 9 | 4 | 1.0 | 840 | 4.3 | 1.8 | 1.5 | 62% | 62% | 61% | 240% |
| Embodiment 10 | 4 | 1.1 | 840 | 4.5 | 2.0 | 1.5 | 68% | 67% | 66% | 305% |
| Embodiment 11 | 4 | 0.8 | 800 | 3.9 | 1.6 | 0.5 | 62% | 63% | 64% | 342% |
| Embodiment 12 | 4 | 0.8 | 820 | 4.0 | 1.5 | 0.9 | 55% | 52% | 56% | 260% |
| Embodiment 13 | 4 | 0.8 | 860 | 4.4 | 1.3 | 2.2 | 46% | 45% | 45% | 230% |
| Embodiment 14 | 4 | 0.8 | 880 | 4.5 | 1.2 | 3.0 | 41% | 40% | 41% | 200% |
| Embodiment 15 | 4 | 0.8 | 840 | 4.2 | 1.4 | 1.5 | 45% | 46% | 50% | 222% |
| Embodiment 16 | 4 | 0.8 | 840 | 4.5 | 1.5 | 1.5 | 52% | 50% | 53% | 780% |
| Comparative Embodiment 1 | 12 | 1.0 | 780 | 4.4 | 1.1 | 0.2 | 5% | 7% | 6% | 7% |
| Comparative Embodiment 2 | 2 | 0.8 | 760 | 1.8- | 2.2 | 0.3- | 120% | 116% | 122% | 650% |

Test results of the cycle performance test, the 500-cycle expansion rate test, and the high-temperature storage expansion rate test of the lithium-ion batteries in Embodiments 1~16 and Comparative Embodiments 1 and 2 are shown Table 2 below.

TABLE 2

| Embodiment/ Comparative Embodiment | Cycle capacity retention rate | 500-cycle expansion rate | High-temperature storage expansion rate |
|---|---|---|---|
| Embodiment 1 | 90% | 10% | 16% |
| Embodiment 2 | 92% | 9% | 14% |
| Embodiment 3 | 92% | 10% | 14% |
| Embodiment 4 | 90% | 11% | 18% |
| Embodiment 5 | 88% | 15% | 23% |
| Embodiment 6 | 85% | 19% | 30% |
| Embodiment 7 | 88% | 13% | 22% |
| Embodiment 8 | 91% | 10% | 17% |
| Embodiment 9 | 92% | 9% | 15% |
| Embodiment 10 | 91% | 9% | 14% |
| Embodiment 11 | 86% | 16% | 25% |
| Embodiment 12 | 88% | 14% | 22% |
| Embodiment 13 | 94% | 6% | 11% |
| Embodiment 14 | 96% | 5% | 9% |
| Embodiment 15 | 85% | 11% | 18% |
| Embodiment 16 | 91% | 16% | 27% |
| Comparative Embodiment 1 | 80% | 28% | 48% |
| Comparative Embodiment 2 | 85% | 20% | 37% |

As shown in Table 1, in Embodiments 1~5 and 7~16 of this application, the particle size, the distribution span of the precursor, and the first-time sintering temperature are adjusted to effectively control the degree of soft agglomeration of the secondary particles in the positive electrode material and enable the positive electrode material to satisfy the following relational expression: 15%≤(Dv50a−Dv50b)/Dv50b≤80%. Specifically, as can be learned from Comparative Embodiments 1~6, the Dv50 value of the precursor in the embodiments of this application exerts a significant effect on Dv50 of the secondary particles of the positive electrode material generated from the precursor. The lower the Dv50 value of the secondary particles, to a higher degree the soft agglomeration will occur. The positive electrode materials in Comparative Embodiments 1 and 2 and Embodiment 6 do not meet the particle size range for controlling the degree of soft agglomeration according to the embodiments of this application, indicating that the agglomeration of the secondary particles of the positive electrode material is too compact and is inhomogeneously distributed. This is likely to give rise to scratches on the positive electrode material during coating, and is adverse to processing and to preparation of the positive electrode and the lithium-ion battery. In addition, as can be learned from Comparative Embodiments 1 and 7~10, the distribution span value of the precursor in the embodiments of this application exerts a significant effect on the distribution span of the secondary particles of the positive electrode material generated from the precursor. The larger the distribution span of the secondary particles, the more likely the soft agglomeration is to be formed. In addition, as can be learned from Comparative Embodiments 1 and 11~14, the higher the first-time sintering temperature in the embodiments of this application, the larger the average particle size of the primary particles of the generated positive electrode material.

Figure 2:
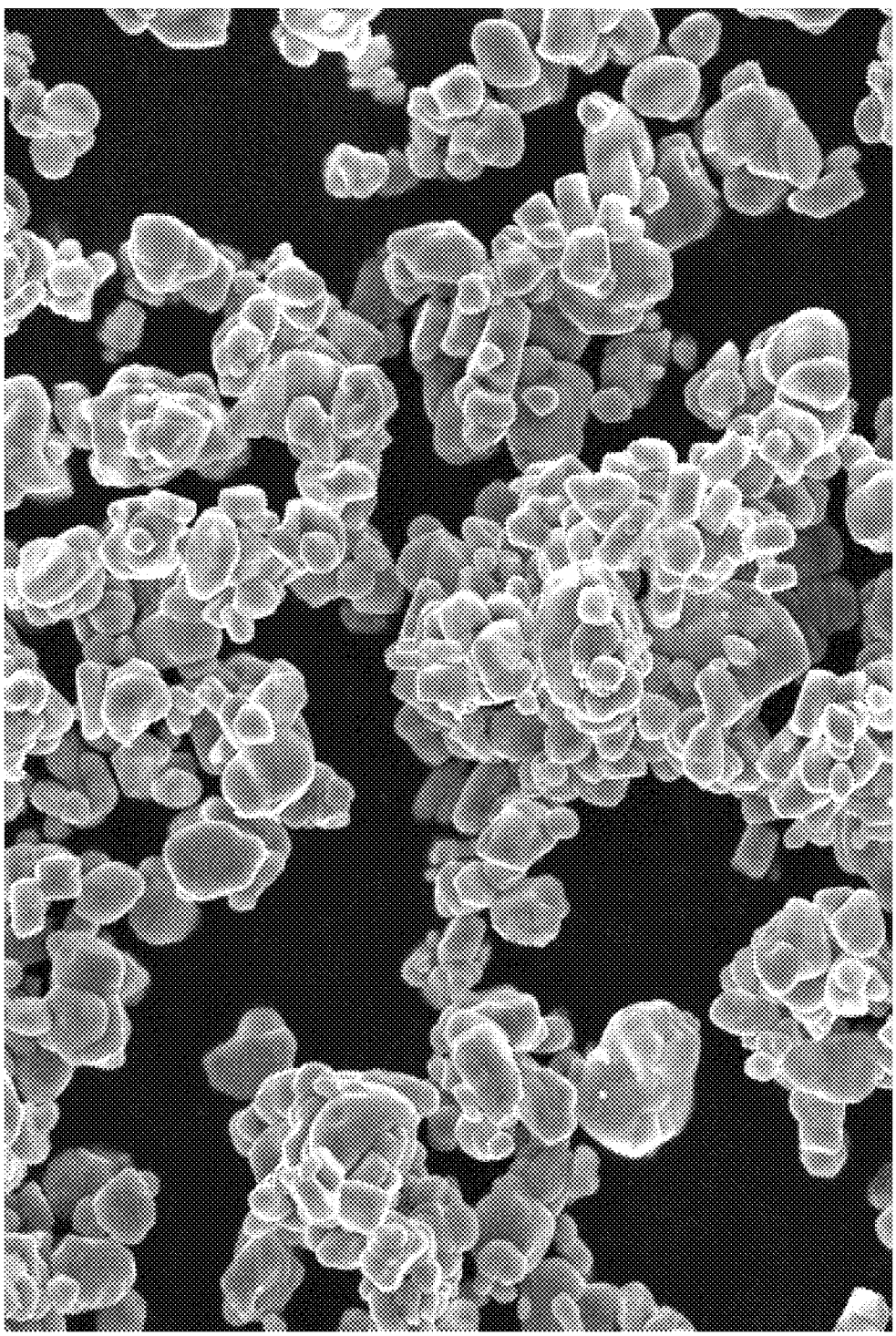
FIG. 2 is a 3000× scanning electron microscope (SEM) image of secondary particles according to an embodiment of this application.
Figure 3:
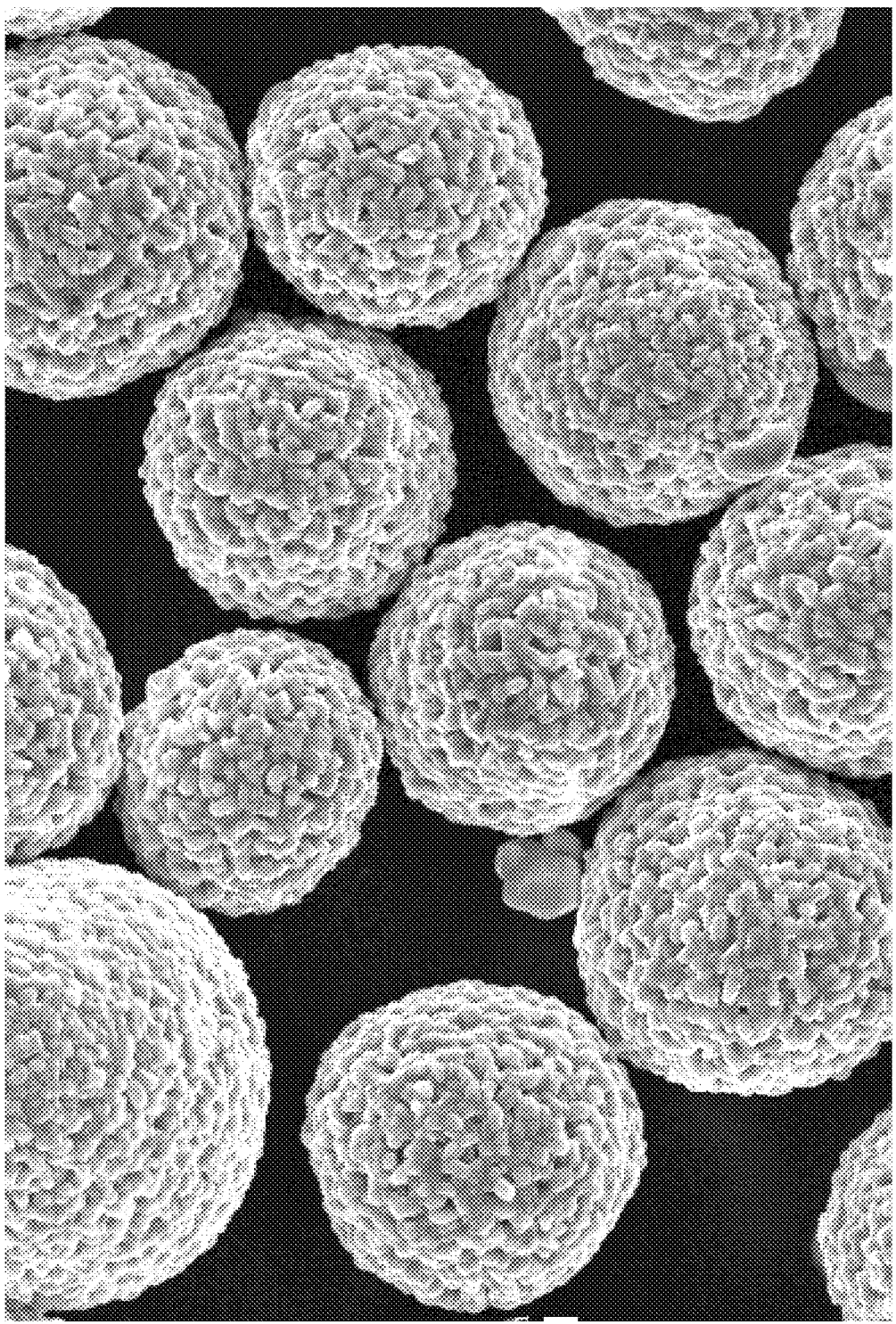
FIG. 3 is a 3000× scanning electron microscope image of secondary particles according to the prior art.
Figure 4:
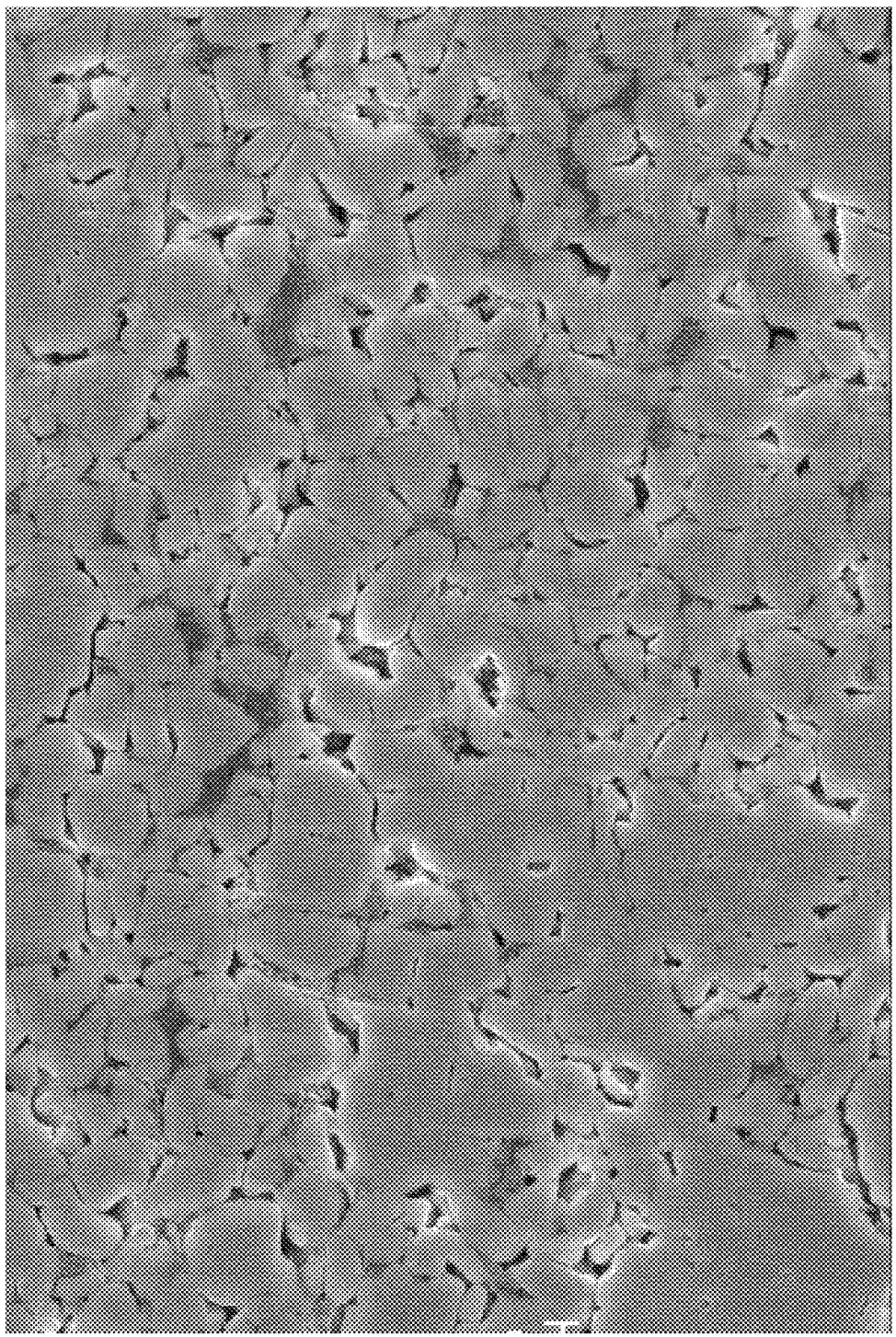
FIG. 4 is a 4000× scanning electron microscope image of a positive electrode according to an embodiment of this application.
Figure 5:
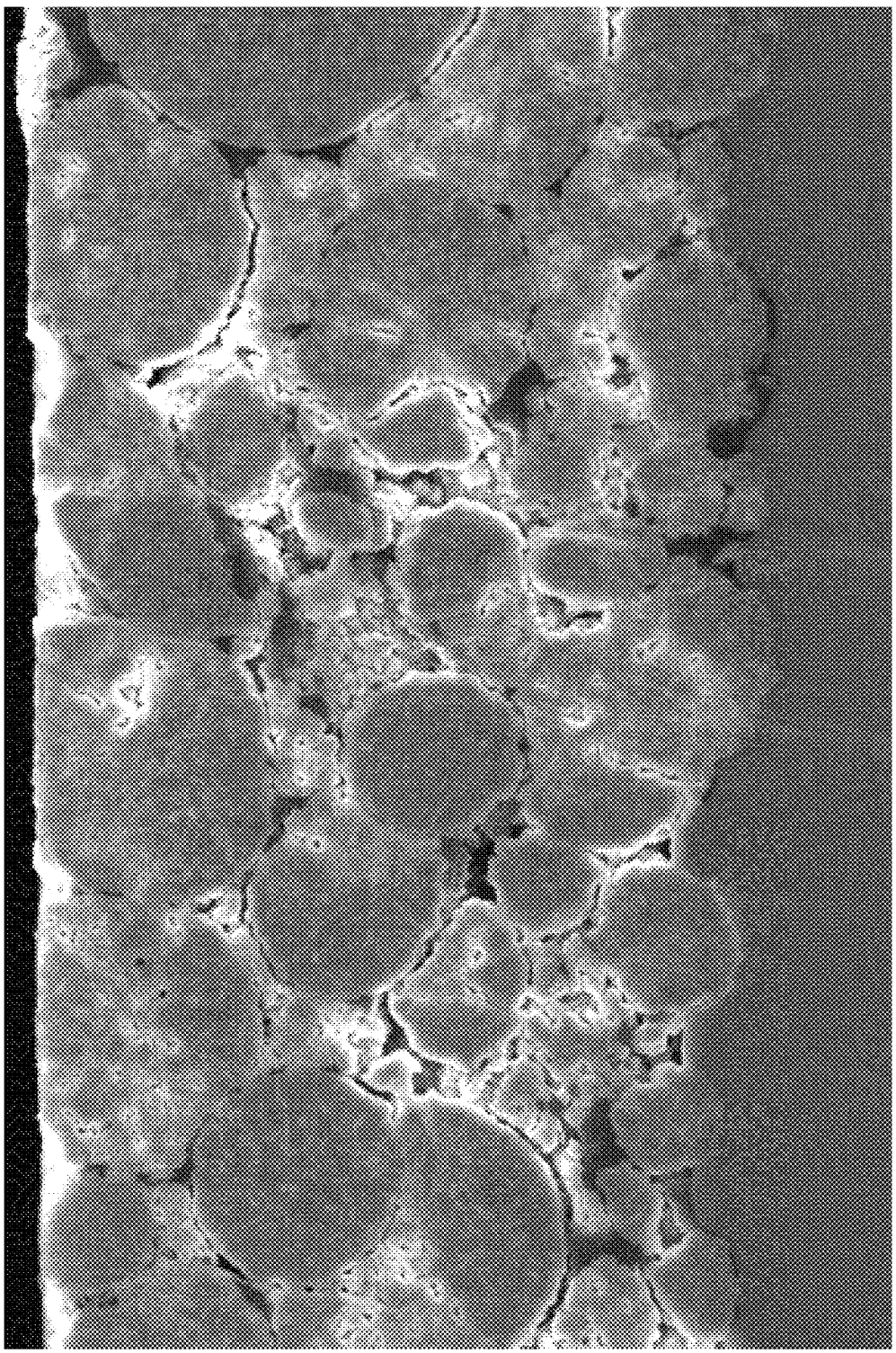
FIG. 5 is a 2000× scanning electron microscope image of a positive electrode according to the prior art.
Figure 6:
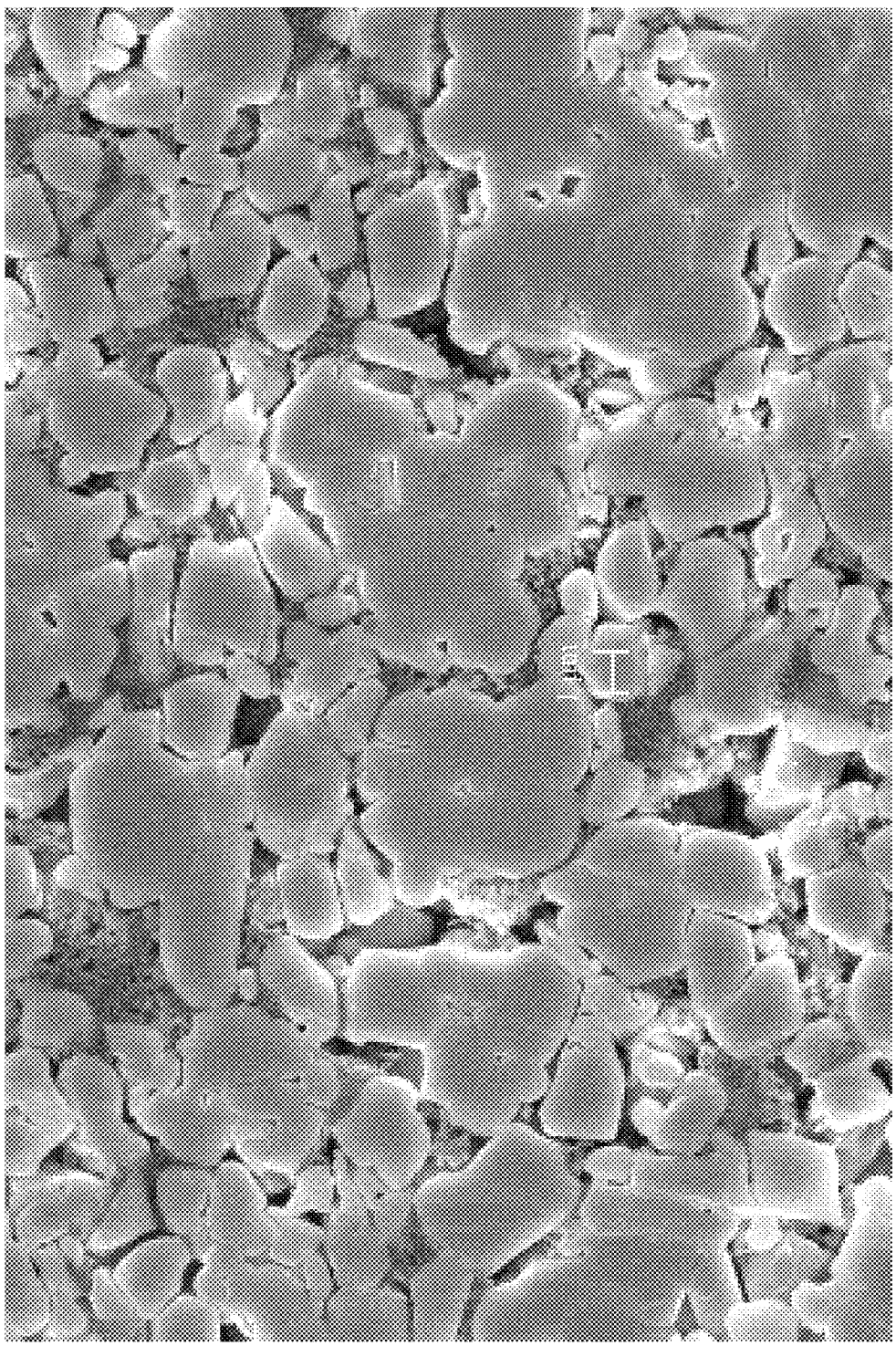
FIG. 6 is a 5000× scanning electron microscope image of a positive electrode after a cycling test according to an embodiment of this application.
Figure 7:
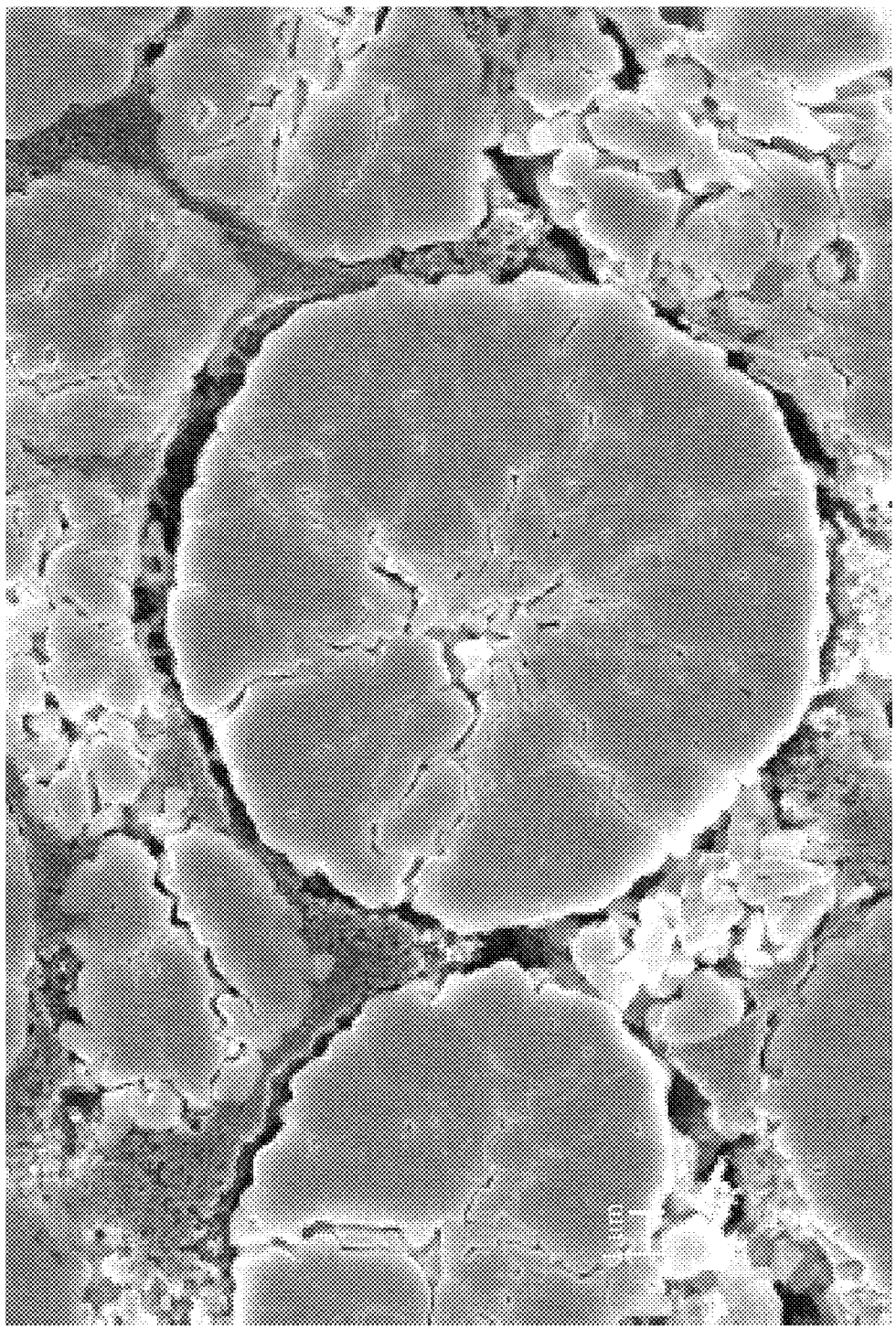
FIG. 7 is a 5000× scanning electron microscope image of a positive electrode after a cycling test according to the prior art.

FIG. 2 and FIG. 3 show a scanning electron microscope image of the (highly soft-agglomerated) secondary particles of the positive electrode material according to Embodiment 1 and a scanning electron microscope image of the (highly hard-agglomerated) secondary particles of the positive electrode material according to Comparative Embodiment 1, respectively. FIG. 4 and FIG. 5 show a scanning electron microscope image of a positive electrode material according to Embodiment 1 and a scanning electron microscope image of a positive electrode material according to Comparative Embodiment 1 after cold calendering, respectively. FIG. 6 and FIG. 7 show a scanning electron microscope image of a positive electrode material according to Embodiment 1 and a scanning electron microscope image of a positive electrode material according to Comparative Embodiment 1 after cycle tests, respectively.

Referring to FIG. 2 and FIG. 3, in the embodiments of this application, the secondary particles of the positive electrode material in a soft-agglomerated particle structure have relatively loose agglomeration of primary particles and a structure not compactly bonded, as compared with hard-agglomerated secondary particles. After the positive electrode material is cold-calendered, as shown in FIG. 4, the positive electrode material with highly soft-agglomerated secondary particles is rather homogeneously distributed in the positive electrode, and spaces between the secondary particles are smaller. In contrast, as shown in FIG. 5, because the hard-agglomerated secondary particles are compactly agglomerated, the particle shape is very obvious. Consequently, the positive electrode material is distributed inhomogeneously in the positive electrode, and the spaces between the particles are too large. This may cause the particles of the positive electrode material to rupture when receiving an external force or colliding, thereby generating particulate matters.

After 500 cycles, as shown in FIG. 6 and FIG. 7, the highly soft-agglomerated secondary particles are not affected by the stress caused by the volume expansion and contraction of the primary particles during the cycle due to a loose structure. However, the hard-agglomerated secondary particles may rupture, and a large quantity of ruptured particles further lead to distribution inhomogeneity of the positive electrode material in the positive electrode, and affect the cycle performance of the electrochemical device.

As can be learned from Table 1 and Table 2, in contrast with Comparative Embodiments 1~2 and Embodiment 6, the lithium-ion batteries that contain the positive electrode material hereof in Embodiments 1~5 and 7~16 of this application enhance the cycle performance and the high-temperature storage performance significantly. As can be learned from comparison between Comparative Embodiments 1~2 and Embodiments 1~16, the lithium-ion batteries that contain the positive electrode material of the particle size distribution in the embodiments of this application can effectively maintain a cycle capacity retention rate of more than 85% in the cycle test. In the cycle expansion rate test and the storage expansion rate test, in contrast with Comparative Embodiments 1~2 and Embodiment 6, both the cycle expansion rate and the high-temperature storage expansion rate of the lithium-ion batteries in Embodiments 1~5 and 7~16 of this application are significantly lower. This means that the soft agglomeration of the secondary particles of the positive electrode material in this application can effectively reduce particle ruptures in the positive electrode material, thereby decreasing the content of ruptured particles and particulate matters in the positive electrode material, and avoiding inhomogeneous or excessive reaction between the positive electrode material and the electrolytic solution. This improves the cycle performance of the lithium-ion batteries, and reduces gas generation of the positive electrode material stored at a high temperature.

Further, as can be learned from comparison between Embodiment 1 and Embodiments 11~14, the larger the average particle size of the primary particles of the positive electrode material in this application, the higher the cycle capacity retention rate and the lower the cycle expansion rate and the high-temperature storage expansion rate. This means that by using the soft-agglomerated secondary particles, the electrochemical device can further use the primary particles of a larger average particle size as a positive electrode material, and can achieve a higher cycle capacity retention rate and higher stability without being ruptured under the effect of the particle structure of the secondary particles.

Further, as can be learned from comparison between Embodiment 1 and Embodiment 15, the secondary particles of the positive electrode material in this application are further provided with a material layer to improve the cycle capacity retention rate of the lithium-ion battery without much affecting the degree of soft agglomeration. The degree of soft agglomeration of the positive electrode material is similar between Embodiment 1 and Embodiment 15, the results of the cycle expansion rate and the high-temperature storage expansion rate are not much different between the two embodiments, indicating that the degree of soft agglomeration of the positive electrode material can effectively improve the cycle stability of the positive electrode.

Finally, as can be learned from comparison between Embodiment 1 and Embodiment 16, when the Dv99 particle size range of the secondary particles is not within the range in the embodiments of this application, the cycle performance and the safety performance of the lithium-ion battery will decline.

Through the comparison between the embodiments and the comparative embodiments, it is clearly understandable that, by controlling the particle size and the distribution span of the precursor during the preparation of the positive electrode material, the positive electrode material in this application can satisfy the following relational expression: $15\% \leq (Dv50a - Dv50b)/Dv50b \leq 80\%$, so as to increase the degree of soft agglomeration of the secondary particles and enhance the cycle performance and high-temperature storage performance of the electrochemical device.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. A positive electrode material, comprising:
   secondary particles, wherein the secondary particles are formed by agglomerating primary particles;
   wherein the positive electrode material comprises at least one of compounds represented by a chemical formula $Li_xNi_yM1_zM2_uO_2$, wherein $0.95 \leq x \leq 1.05$, $0.33 < y < 1$, $0 < z \leq 0.6$, $0 < u \leq 0.2$, $y+z+u=1$, M1 is selected from the group consisting of Co, Mn, Al, and any combination thereof, and M2 is selected from the group consisting of Sc, V, Cr, Fe, Cu, Zn, Y, Zr, Nb, Mo, Tc, Ru, Rh, Pd, Ag, Cd, La, Ce, Pr, Nd, Pm, Sm, Eu, Gd, Tb, Dy, Ho, Er, Tm, Yb, Lu, Mg, Ti, and any combination thereof; and
   the positive electrode material satisfies the following relational expression:

$15\% \leq (Dv50a-Dv50b)/Dv50b \leq 80\%$;

wherein,
   Dv50a represents a particle size of the positive electrode material at a cumulative volume of 50% in a volume-based particle size distribution of the positive electrode material;
   Dv50b represents a particle size of the positive electrode material after an ultrasound treatment, at a cumulative volume of 50% in a volume-based particle size distribution of the positive electrode material after the ultrasound treatment and
   a frequency of the ultrasonic treatment is 40 kHz, a power of the ultrasonic treatment is 180 W, and a time of the ultrasonic treatment is 5 minutes.

2. The positive electrode material according to claim 1, wherein the positive electrode material has at least one of the following characteristics:

$15\% \leq (Dv10a-Dv10b)/Dv10b \leq 80\%$; (a)

$15\% \leq (Dv90a-Dv90b)/Dv90b \leq 80\%$; and (b)

$10\% \leq (Dv99a-Dv99b)/Dv99b \leq 500\%$; (c)

wherein, Dv10a represents Dv10 directly measured by the laser particle size analyzer for the positive electrode material without ultrasonic treatment, Dv10b represents Dv10 measured by the laser particle size analyzer for the positive electrode material after ultrasonic treatment, Dv90a represents Dv90 directly measured by the laser particle size analyzer for the positive electrode material without ultrasonic treatment, Dv90b represents Dv90 measured by the laser particle size analyzer for the positive electrode material after ultrasonic treatment, Dv99a represents Dv99 directly measured by the laser particle size analyzer for the positive electrode material without ultrasonic treatment, Dv99b represents Dv99 measured by the laser particle size analyzer for the positive electrode material after ultrasonic treatment, Dv10 represents a particle size of the positive electrode material at a cumulative volume of 10% in the volume-based particle size distribution as measured by starting from small particle sizes, Dv90 represents a particle size of the positive electrode material at a cumulative volume of 90% in the volume-based particle size distribution as measured by starting from small particle sizes, and Dv99 represents a particle size of the positive electrode material at a cumulative volume of 99% in the volume-based particle size distribution as measured by starting from small particle sizes.

3. The positive electrode material according to claim 2, wherein $1.0 \leq (Dv90b-Dv10b)/Dv50b \leq 2.5$.

4. The positive electrode material according to claim 1, wherein Dv50b of the positive electrode material is 2 μm to 8 μm.

5. The positive electrode material according to claim 1, wherein an average particle size of the primary particles is 0.5 μm to 3 μm.

6. The positive electrode material according to claim 1, wherein the secondary particles further comprise a material layer, the material layer is disposed on at least a part of a surface of the secondary particles, and the material layer comprises at least one of elements B, P, Al, Zr, C, or S.

7. An electrochemical device, comprising:
   a negative electrode;
   a separator; and
   a positive electrode, comprising a positive electrode material,
   wherein the positive electrode material comprises secondary particles, the secondary particles are formed by agglomerating primary particles;
   wherein the positive electrode material comprises at least one of compounds represented by a chemical formula $Li_xNi_yM1_zM2_uO_2$, wherein $0.95 \leq x \leq 1.05$, $0.33 < y < 1$, $0 < z \leq 0.6$, $0 < u \leq 0.2$, $y+z+u=1$, M1 is selected from the group consisting of Co, Mn, Al, and any combination thereof, and M2 is selected from the group consisting of Sc, V, Cr, Fe, Cu, Zn, Y, Zr, Nb, Mo, Tc, Ru, Rh, Pd, Ag, Cd, La, Ce, Pr, Nd, Pm, Sm, Eu, Gd, Tb, Dy, Ho, Er, Tm, Yb, Lu, Mg, Ti, and any combination thereof; and
   the positive electrode material satisfies the following relational expression:

$15\% \leq (Dv50a-Dv50b)/Dv50b \leq 80\%$;

wherein,
   Dv50a represents a particle size of the positive electrode material at a cumulative volume of 50% in a volume-based particle size distribution of the positive electrode material;
   Dv50b represents a particle size of the positive electrode material after an ultrasound treatment, at a cumulative volume of 50% in a volume-based particle size distribution of the positive electrode material after the ultrasound treatment; and a frequency of the ultrasonic treatment is 40 kHz, a power of the ultrasonic treatment is 180 W, and a time of the ultrasonic treatment is 5 minutes.

8. The electrochemical device according to claim 7, wherein the positive electrode material has at least one of the following characteristics:

$$15\% \leq (Dv10a-Dv10b)/Dv10b \leq 80\%; \quad (a)$$

$$15\% \leq (Dv90a-Dv90b)/Dv90b \leq 80\%; \text{ and} \quad (b)$$

$$10\% \leq (Dv99a-Dv99b)/Dv99b \leq 500\%; \quad (c)$$

wherein, Dv10a represents Dv10 directly measured by the laser particle size analyzer for the positive electrode material without ultrasonic treatment, Dv10b represents Dv10 measured by the laser particle size analyzer for the positive electrode material after ultrasonic treatment, Dv90a represents Dv90 directly measured by the laser particle size analyzer for the positive electrode material without ultrasonic treatment, Dv90b represents Dv90 measured by the laser particle size analyzer for the positive electrode material after ultrasonic treatment, Dv99a represents Dv99 directly measured by the laser particle size analyzer for the positive electrode material without ultrasonic treatment, Dv99b represents Dv99 measured by the laser particle size analyzer for the positive electrode material after ultrasonic treatment, Dv10 represents a particle size of the positive electrode material at a cumulative volume of 10% in the volume-based particle size distribution as measured by starting from small particle sizes, Dv90 represents a particle size of the positive electrode material at a cumulative volume of 90% in the volume-based particle size distribution as measured by starting from small particle sizes, and Dv99 represents a particle size of the positive electrode material at a cumulative volume of 99% in the volume-based particle size distribution as measured by starting from small particle sizes.

9. The electrochemical device according to claim 7, wherein $1.0 \leq (Dv90b-Dv10b)/Dv50b \leq 2.5$.

10. The electrochemical device according to claim 7, wherein Dv50b of the positive electrode material is 2 μm to 8 μm.

11. The electrochemical device according to claim 7, wherein an average particle size of the primary particles is 0.5 μm to 3 μm.

12. The electrochemical device according to claim 7, wherein the secondary particles further comprise a material layer, the material layer is disposed on at least a part of a surface of the secondary particles, and the material layer comprises at least one of elements B, P, Al, Zr, C, or S.

13. The electrochemical device according to claim 7, wherein a compacted density of the positive electrode is 4.05 g/cm³ to 4.3 g/cm³.

14. An electronic device, comprising an electrochemical device, the electrochemical device comprising:
a negative electrode;
a separator; and
a positive electrode, comprising a positive electrode material, wherein the positive electrode material comprises secondary particles, the secondary particles are formed by agglomerating primary particles; and
the positive electrode material satisfies the following relational expression:

$$15\% \leq (Dv50a-Dv50b)/Dv50b \leq 80\%$$

wherein,
Dv50a represents a particle size of the positive electrode material at a cumulative volume of 50% in a volume-based particle size distribution of the positive electrode material;
Dv50b represents a particle size of the positive electrode material after an ultrasound treatment, at a cumulative volume of 50% in a volume-based particle size distribution of the positive electrode material after the ultrasound treatment; and
a frequency of the ultrasonic treatment is 40 kHz, a power of the ultrasonic treatment is 180 W, and a time of the ultrasonic treatment is 5 minutes.

15. The electronic device according to claim 14, wherein the positive electrode material has at least one of the following characteristics:

$$15\% \leq (Dv10a-Dv10b)/Dv10b \leq 80\%; \quad (a)$$

$$15\% \leq (Dv90a-Dv90b)/Dv90b \leq 80\%; \text{ and} \quad (b)$$

$$10\% \leq (Dv99a-Dv99b)/Dv99b \leq 500\%; \quad (c)$$

wherein, Dv10a represents Dv10 directly measured by the laser particle size analyzer for the positive electrode material without ultrasonic treatment, Dv10b represents Dv10 measured by the laser particle size analyzer for the positive electrode material after ultrasonic treatment, Dv90a represents Dv90 directly measured by the laser particle size analyzer for the positive electrode material without ultrasonic treatment, Dv90b represents Dv90 measured by the laser particle size analyzer for the positive electrode material after ultrasonic treatment, Dv99a represents Dv99 directly measured by the laser particle size analyzer for the positive electrode material without ultrasonic treatment, Dv99b represents Dv99 measured by the laser particle size analyzer for the positive electrode material after ultrasonic treatment, Dv10 represents a particle size of the positive electrode material at a cumulative volume of 10% in the volume-based particle size distribution as measured by starting from small particle sizes, Dv90 represents a particle size of the positive electrode material at a cumulative volume of 90% in the volume-based particle size distribution as measured by starting from small particle sizes, and Dv99 represents a particle size of the positive electrode material at a cumulative volume of 99% in the volume-based particle size distribution as measured by starting from small particle sizes.

16. The electronic device according to claim 14, wherein $1.0 \leq (Dv90b-Dv10b)/Dv50b \leq 2.5$.

* * * * *

UNITED STATES PATENT AND TRADEMARK OFFICE
CERTIFICATE OF CORRECTION

| | | |
|---|---|---|
| PATENT NO. | : 11,984,579 B2 | Page 1 of 1 |
| APPLICATION NO. | : 17/187629 | |
| DATED | : May 14, 2024 | |
| INVENTOR(S) | : Wenyuan Liu et al. | |

It is certified that error appears in the above-identified patent and that said Letters Patent is hereby corrected as shown below:

On the Title Page

Item (71) please delete "Applicants: NINGDE AMPEREX TECHNOLOGY LIMITED, Ningde (CN); DONGGUAN AMPEREX TECHNLOGY LIMITED, Dongguan (CN)" and insert --Applicants: NINGDE AMPEREX TECHNOLOGY LIMITED, Ningde (CN); DONGGUAN AMPEREX TECHNOLOGY LIMITED, Dongguan (CN)--

Signed and Sealed this
Fifteenth Day of October, 2024

Katherine Kelly Vidal
*Director of the United States Patent and Trademark Office*